United States Patent Office 3,502,236
Patented Mar. 24, 1970

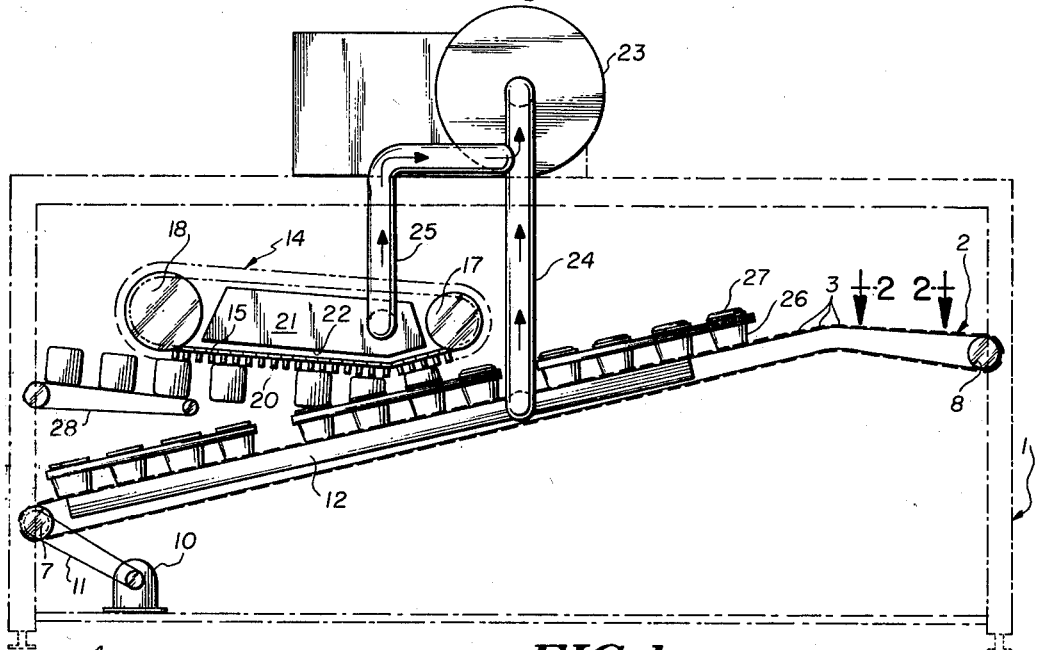
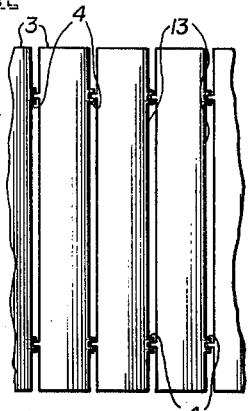
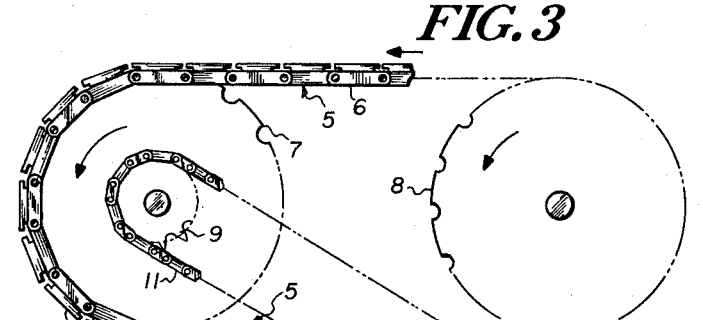
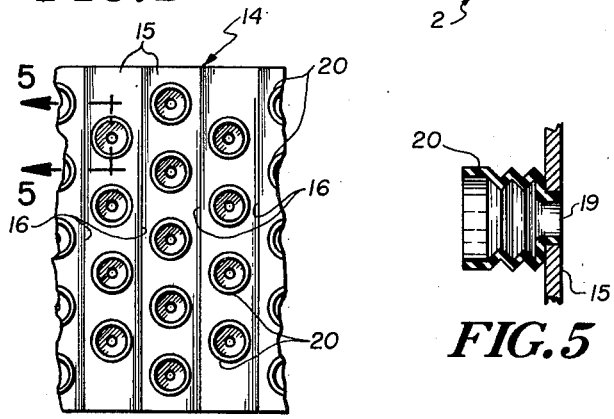
FIG. 1
FIG. 2
FIG. 3
FIG. 4
FIG. 5
INVENTOR.
FRANK STADELMAN
BY
AGENT

3,502,236
DEPANNING APPARATUS FOR BAKERY PRODUCTS
Frank Stadelman, 427 Orchard St., Cranford, N.J. 07016
Filed Aug. 23, 1968, Ser. No. 754,904
Int. Cl. B65b *69/00;* B65g *65/34*
U.S. Cl. 214—309    3 Claims

ABSTRACT OF THE DISCLOSURE

A depanning appartus for bakery products comprising upper and lower endless conveyors each encompassing a suction box, the upper conveyor carrying a plurality of compressible resilient suction applying members communicable with its suction box, the lower conveyor having a plurality of openings therethrough communicable with its suction box whereby when pans containing bakery products are passed between the conveyors with the top surfaces of the bakery products in contact with the resilient suction applying members of the upper conveyor and the bottom of the pans in contact with the lower conveyor, the combined suction boxes operate to provide suction forces opposing each other to lift the bakery products out of the pans along the forward direction of travel of the upper conveyor while retaining the pans on the lower conveyor along its forward direction of travel.

BACKGROUND OF THE INVENTION

Depanning apparatus types comprising upper and lower conveyors with the upper conveyor provided with a suction box for lifting bakery products from pans are known.

For example, Patent No. 3,066,812 describes and illustrates such an apparatus. In order to retain the pans on the lower conveyor while the bakery products are lifted out, some types of apparatus employ magnetic inserts on the lower conveyor to retain the pans on the conveyor. While magnetic retention of the pans works satisfactorily with pans made of iron-containing metal, it does not operate when the pans are made from aluminum. Aluminum is desirable as a pan metal because it does not rust or corrode as do iron pans after some use under oven baking temperatures. It is herein contemplated to provide a pan retention means which operates both with iron or aluminum baking pans.

SUMMARY OF THE INVENTION

In accordance with the invention there is provided a depanning apparatus for bakery products comprising first and second endless conveyors positioned one above the other, one conveyor being inclined relative to the other and diverging away from the other in the forward direction of travel of the conveyors, the upper conveyor encompassing a first suction box having an open bottom adjacent the conveyor inner surface, the upper conveyor carrying a plurality of compressible resilient suction applying members such as resilient foam rubber pads or resilient bellows suction communicable with the first suction box through the conveyor, the lower conveyor encompassing a second suction box having an open top adjacent the conveyor inner surface, the lower conveyor having a plurality of openings therethrough communicable with the second suction box through the conveyor, whereby when pans containing bakery products are passed between the conveyors with the bakery products in contact with the resilient suction applying members of the upper conveyor and the bottom of the pans in contact with the lower conveyor above the second suction box, the combined suction boxes operate to provide suction forces simultaneously opposing each other to lift the makery products out of the pans along the forward direction of travel of the upper conveyor while retaining the pans on the upper surface of the lower conveyor along its forward direction of travel, thereby effectively depanning the bakery products.

DESCRIPTION OF THE DRAWINGS

FIGURE 1 illustrates a partly elevational and partly schematic side view of the apparatus of the invention, FIGURE 2 illustrates a top view along lines 2—2 of FIGURE 1, FIGURE 3 illustrates a side view of a conveyor including its motivating means, FIGURE 4 illustrates a top view of a portion of a conveyor provided with a plurality of suction applying members, and FIGURE 5 illustrates a cross-sectional view along lines 5—5 of FIGURE 4.

DESCRIPTION OF THE PREFERRED EMBODIMENTS

Referring to the figures, the depanning apparatus is mounted in a frame generally designated as 1 and in which the apparatus of the invention is suitably mounted. The frame is shown in outline to more clearly show the apparatus. The apparatus comprises a first conveyor 2 of the apron type more clearly illustrated by FIGURES 2 and 3. The conveyor comprises flat rotatably interconnected rectangular plates 3 arranged laterally adjacent each other and interconnected by linkage 4. The plates 3 are carried by an endless chain 5 with each of the plates secured, such as by welding, to a link 6 of the chain 5 with the width of each plate being substantially co-extensive with each link 6 to which it is secured. The chain 5 passes over a driving sprocket 7 located near the exit end of the conveyor 2 with the plates 3 passing about the sprocket 7 downwardly and away from the effective forward direction of travel toward and around the sprocket 8. The motivating sprocket 7 is provided with a coaxial gear 9 connected to a suitable motor 10 by means of chain 11. The conveyor 2 encompasses a suction box 12 having an open top adjacent the inner surface of conveyor 2 and the conveyor is provided with openings 13 between the plates 3 communicable with the open top of the suction box 12.

Another endless conveyor 14 is positioned directly above the conveyor 2 and vertically spaced therefrom. The conveyor 2 is inclined downwardly relative to conveyor 14 and diverges away from conveyor 14 in the forward direction of travel of the conveyors. Conveyor 14 comprises plates 15 laterally abutting each other as at 16 and is otherwise motivated by one of its two carrying sprockets 17 and 18 in the same manner described with respect to conveyor 2. Each plate 15 is provided with a plurality of spaced apertures 19 along the width of the conveyor and suction applying resilient bellows 20 are mounted in the apertures and extend outwardly of the conveyor for cushioning contact with a bakery product as illustrated by FIGURES 4 and 5. Another suction box 21 is encompassed by endless conveyor 14. The suction box 21 has an open bottom 22 adjacent the conveyor inner surface and the bellows 20 being communicable with the open bottom of the suction box through the apertures 19.

A vacuum producing turbine 23 is mounted on frame 1 and conduits 24 and 25 are connected between the turbine 23 and the two suction boxes 12 and 21 for simultaneously providing a vacuum suction in both suction boxes. Preferably one of the conduits 24 is connected directly to the suction producing turbine 23 and the other conduit 25 branches from the directly connected conduit 24.

In operation, baking pans 26 containing a bakery product 27, e.g. bread, are passed from an oven onto the entrance end of conveyor 2 while the suction boxes are under vacuum suction. When the pans containing the bakery product pass between the conveyors 2 and 21, the suction applying members 20 come into cushioned contact with the bakery product in the effective range of suction box 21 and the bottom of the pans are in contact with conveyor 2 in the effective range of the suction box 12. As the pan and product move forwardly, the two suction boxes operate simultaneously with the conveyor 14 lifting the product out of the pans along the forward direction of travel while the conveyor 2 suction holds the pans onto its surface. Since the two conveyors diverge away from each other along the forward direction of travel the products are completely lifted out of their pans and deposited onto a third conveyor 28 for further processing.

What is claimed is:

1. A depending apparatus for bakery products comprising first and second endless conveyors positioned one above the other, one conveyor being inclined relative to the other and diverging away from the other in the forward direction of travel of the conveyors, the upper conveyor encompassing a first suction box having an open bottom adjacent the conveyor lower inner surface, the said upper conveyor carrying a plurality of compressible resilient suction applying members suction communicable with the first suction box through the conveyor, the lower conveyor encompassing a second suction box having an open top adjacent the conveyor upper inner surface, said lower conveyor having a plurality of openings through the conveyor and suction communicable with the second suction box, a suction producing means, and conduits leading from each suction box to the suction producing means, whereby when pans containing bakery products are passed between the conveyors with the top surfaces of the bakery products in contact with the resilient suction applying members and the bottom of the pans in contact with the lower conveyor, the combined suction boxes operate to provide suction forces opposing each other to retain the pans on the lower conveyor and lift the bakery products out of the pans along the forward direction of travel of both conveyors.

2. A depanning apparatus according to claim 1, wherein one of the conduits is connected directly to the suction producing means and another conduit branches from the directly connected conduit.

3. A depanning apparatus according to claim 1, wherein the lower conveyor comprises a series of flat rotatably interconnected rectangular plates having openings therebetween, said openings being suction communicable with the second suction box.

References Cited

UNITED STATES PATENTS 2,975,920   3/1961   Reed    214—309
3,325,025   6/1967   Irving    214—309

GERALD M. FORLENZA, Primary Examiner

G. F. ABRAHAM, Assistant Examiner

U.S. Cl. X.R.

214—1